July 9, 1963 G. B. WHINERY 3,097,279
THERMAL RELAY
Filed Jan. 9, 1959 3 Sheets-Sheet 1

INVENTOR.
George B. Whinery
BY
Harness, Dickey & Pierce
ATTORNEYS.

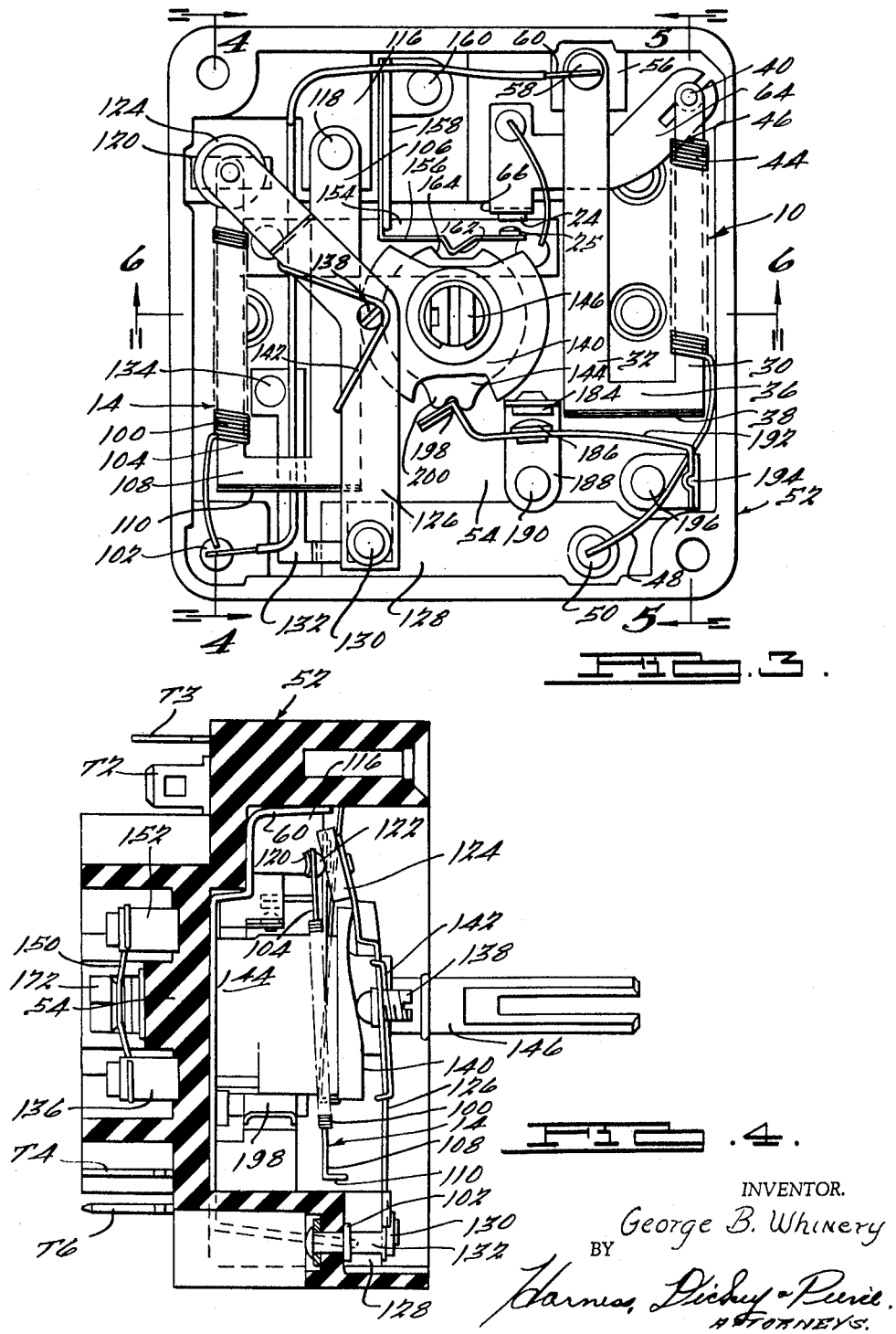

July 9, 1963  G. B. WHINERY  3,097,279
THERMAL RELAY
Filed Jan. 9, 1959  3 Sheets-Sheet 3
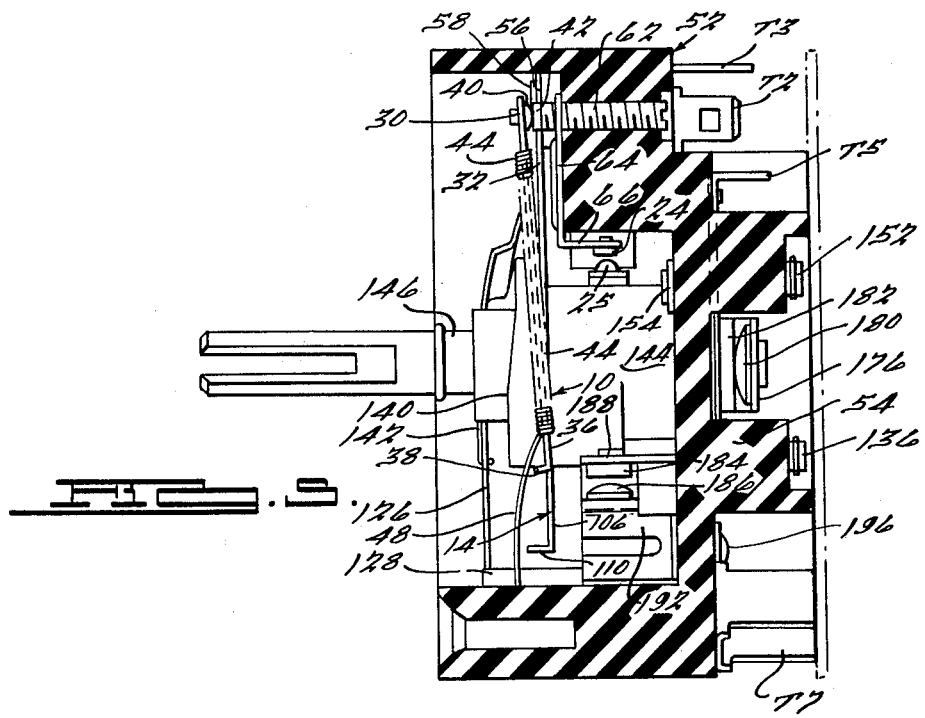
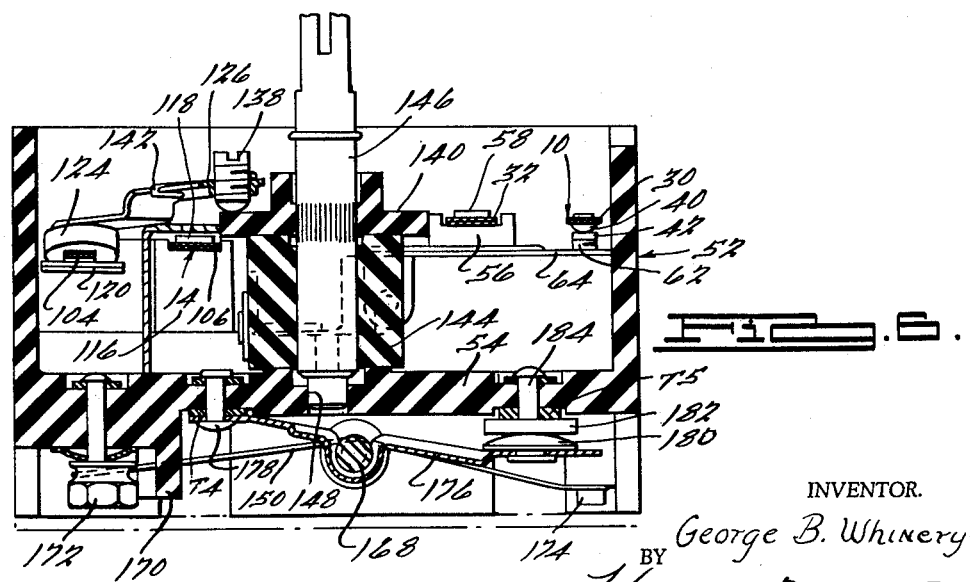
INVENTOR.
George B. Whinery
BY
Harness, Dickey & Pierce
ATTORNEYS.

United States Patent Office 3,097,279
Patented July 9, 1963

3,097,279
THERMAL RELAY
George B. Whinery, Ann Arbor, Mich., assignor to King-Seeley Thermos Co., a corporation of Michigan
Filed Jan. 9, 1959, Ser. No. 785,967
10 Claims. (Cl. 200—113)

*Electro-Responsive System*

This invention relates to temperature controlling systems and more particularly to apparatus for controlling the operation of a heater in accordance with the sensed temperature of a body.

This invention is an improvement upon the system disclosed in the United States patent application of George B. Whinery, Serial No. 604,867, filed August 20, 1956, now Patent No. 3,005,896, of Harry I. Baker application Serial No. 773,263, filed November 12, 1958, now Patent No. 2,962,575, of Tore B. Hanssen application Serial No. 773,286, filed November 12, 1958, and of E. E. Sivacek Patent No. 2,846,543, and the disclosures of those applications and that patent are incorporated herein by reference.

The principles of the present invention are embodied in a system for controlling the operation of a heater disposed in heat transfer relationship with a body of air such as the air in an oven or a building, in heat transfer relationship with a container body such as a pan disposed in heat transfer relation with the surface heating element on a stove, or in heat transfer relationship with a body to be cooked, melted or cured, such as meat in an oven, food in a pan on the stove, or chemical materials being processed.

In general, the energization of the heater is controlled in accordance with the temperature of the body as determined by a sensing element disposed in heat transfer relation with a body, normally the body being heated, with that sensing element preferably taking the form of a resistor having a high temperature coefficient of resistance. The variable resistance senser is utilized to vary the effective output voltage of a self-interrupting or pulsing thermal relay in accordance with the sensed temperature of the body. The pulsing relay is preferably arranged to deliver output energy as a series or succession of pulsations, the effective voltage of which is substantially independent of variations in the voltage of the source of electrical energy for the control system. The output energy from the pulsing relay is applied to a control or responder relay which, in the illustrated embodiment, responds only to the effective value of the applied voltage rather than to the individual pulsations. The responder relay, in turn, controls an output relay which controls the energization of the heater.

The output relay is of the hot wire or sag wire type. One of two mating electrical contacts is supported upon a cantilever spring which is biased or pretensioned in a direction to tend to force the contacts together. A wire having a substantial temperature coefficient of thermal expansion is supported between a pair of uprights and normally exerts a force upon the spring to hold the contacts separated. When a current is passed through the wire, the resultant self-heating of the wire causes the wire to elongate so as to relieve the restraining force upon the spring and to permit the contacts to close. The disclosed system, in normal use, tends to be subject to substantial changes and ambient temperature. The present invention pertains to means for compensating the hot wire relay for such variations so that the relay will operate consistently despite variations in the temperature to which it is subjected.

It is to be understood that certain of the principles of the present invention are applicable to indication as well as control, and that accordingly the control which is exerted by the subject equipment can be applied to the control of an indicator as well as to the control of other types of output or load devices.

The principles, objects and features of the invention will best be perceived from the following detailed description of an embodiment of the invention when read with reference to the accompanying drawings, in which:

FIG. 3 is a front elevational view of the structure of FIG. 2 with the cover removed to expose the components;

FIG. 4 is a sectional view taken substantially along the line 4—4 of FIG. 3;

FIG. 5 is a sectional view taken substantially along the line 5—5 of FIG. 3, and FIG. 6 is a sectional view taken substantially along the line 6—6 of FIG. 3.

Figure 1:
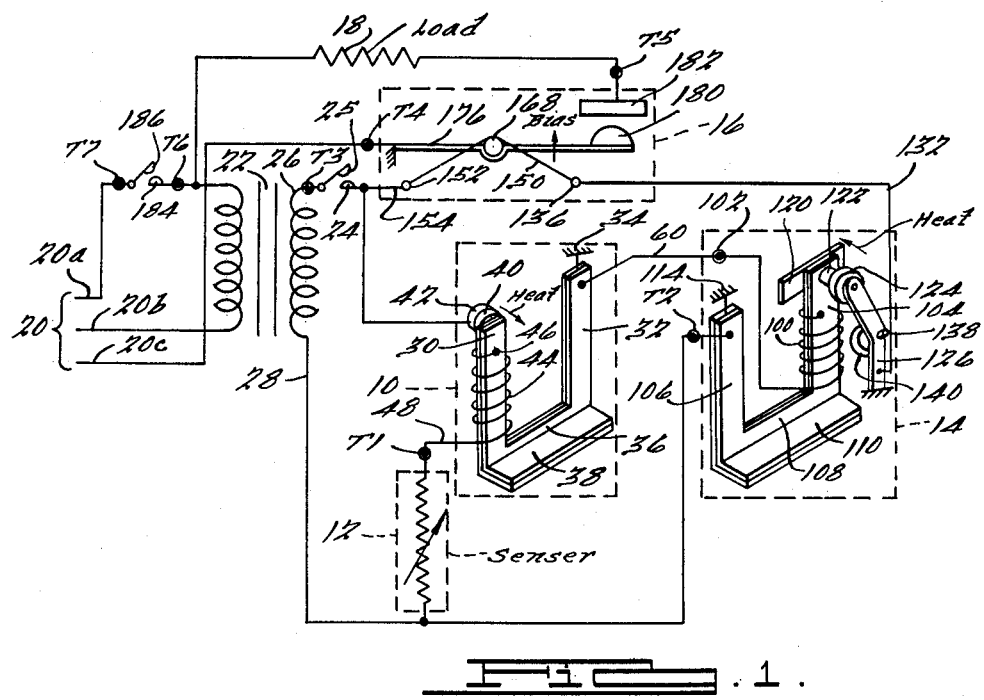
FIGURE 1 is a schematic representation of a temperature controlling system embodying the principles of the present invention.

The system disclosed in FIG. 1 of the drawings comprises a pulser 10 controlled by a senser 12 and controlling a responder 14 which controls an output relay 16 to control the energization of a load 18 from a source of energy 20, the control system also being energized from the source 20 through a transformer 22.

The senser 12 is preferably a resistor having a high temperature coefficient of resistance and disposed in heat transfer relationship with a body. Senser 12 may be constructed of wire and have a high positive temperature coefficient of resistance or may be, for example, a ceramic thermistor element having a high negative temperature coefficient of resistance, it being assumed in the illustrated arrangement that a senser having a high positive temperature coefficient of resistance is employed.

Intimate heat transfer relationship between the senser 12 and the body, the temperature of which is being sensed, may be established in any appropriate fashion. For example, the senser may be disposed within a probe for insertion in meat in an oven or in food being cooked in a pan; it may be disposed in a room or in an oven for sensing the temperature of the air; or it may be disposed at the center of a surface heating element in a stove to sense the temperature of the bottom of a pan disposed upon the surface element. An example of a senser unit for the latter purpose and suitable for utilization as an element of the subject system is disclosed in the United States patent application of Emil E. Sivacek, Serial No. 604,917, filed August 20, 1956, and the disclosure of that application is incorporated herein by reference.

The load 18 is herein assumed to be a heating element of the electrical resistance type. Heater 18 will normally, but not necesasrily, be disposed in heat transfer relationship with the same body, the temperature of which is being sensed by senser 12.

The source 20 which supplies the electrical energy for the control system may be, for example, a line source of alternating voltage such as is found in the home and is representatively illustrated as a three-line source, with a nominal 115-volt alternating potential existing between lines 20a and 20b (the neutral), and with a nominal 230-volt alternating potential existing between lines 20a and 20c. As is well known, the line voltage is subject to substantial variation, and accordingly one of the functions of pulsing device 10 is to prevent such variations of line voltage from adversely affecting the consistency of operation of the control equipment. An alternating current is supplied through the primary winding of stepdown transformer 22 from line 20a, terminal T7, switch contacts 184 and 186, terminal T6, and through the primary to line 20b, so that a reduced magnitude voltage appears across the secondary winding of that transformer and hence between conductors 26 and 28. This voltage is applied through the sensor 12 to the electrothermal voltage regulating device 10, one function of which is to receive the noticeably variable voltage between conductors 26 and 28 and to deliver pulsating energy to the device 14 having an effective value which is substantially independent of the variations in the voltage of the source.

Basically, device 10 can be characterized as including a thermally responsive member at least a portion of which tends to move as a consequence of changes in the temperature thereof. Current modulating means, comprising a pair of electrical contacts in the illustrated arrangement, are associated with this member so as to respond to that tendency to move. The current modulating means serve to increase the heat energy supplied to the thermally responsive member in response to decreases in temperature thereof, and vice versa. Consequently, throughout at least a predetermined range of voltages of the source, the current modulating means periodically increase and decrease the energy supplied to the thermally responsive member and cause it to be maintained at a substantially uniform average temperature for any given resistance of sensor 12. On this basis, it will be appreciated that the thermally responsive member receives energy, in pulsating form, at a rate which does not vary with variations in the line voltage. Consequently, the output voltage of the device 10 is in the form of a series or succession of energy pulsations having an effective voltage (a voltage producing the same heating effect in a resistive load as a direct voltage of that same value) which is substantially independent of variations in the source voltage. Further information as to the design and theory of operation of units of this type will be found in United States Patent No. 2,835,885, granted May 20, 1958, to Leonard Boddy.

As may best be seen in the diagrammatic illustration of FIG. 1 and in the structural illustrations of FIGS. 3 and 5, device 10 comprises a polymetallic (representatively bimetallic) thermo-responsive unit including a pair of leg portions 30 and 32 representatively illustrated as lying substantially in a common plane and extending in spaced parallelism with one another in that plane. One end of leg portion 32 is anchored or fixed, as indicated in FIG. 1 by the earthing symbol 34 (which does not connote electrical grounding), and the other end of leg portion 32 is joined to one end of leg portion 30 by means of a cross-piece 36. An upstanding flange 38 is provided to increase the stiffness of crosspiece 36 to the point where that crosspiece will not deflect to any significant degree in response to the mechanical or thermal forces to which the unit is subjected.

The other end of leg portion 30 carries an electrical contact 40, that contact being electrically as well as mechanically integral with leg portion 30. Contact 40 is adapted to cooperate with a fixed or adjustably fixed contact 42, and the unit is constructed so that those contacts are in firm engagement with one another when the temperature differential between leg portions 30 and 32 is zero or substantially zero. It will be appreciated that the provision of a U-shape member of the nature shown will permit compensation for ambient temperature variations since the effect upon the position of contact 40 of heating of leg portion 30 is the opposite of that produced by heating of leg portion 32.

Differential heating of leg portions 30 and 32 is accomplished by heating means in the form of a heater winding 44 representatively disposed in heat transfer relationship with the leg portion 30, and more particularly, coiled around that leg portion. One end of heater winding 44 is electrically connected to leg portion 30 as at 46, and the other end of that winding is connected to conductor 48 which extends to a terminal T1. Terminal T1 is connected to one terminal of the senser 12, and the other terminal of the senser is connected to conductor 28.

The fixed or adjustably fixed contact 42 is connected to conductor 26 when the switch contacts 24 and 25 are closed. As a result, with contacts 40—42 initially closed, heater winding 44 is connected in series with senser 12 across the secondary winding of transformer 22 so that current flows through contacts 42 and 40, through the heater winding 44, and through senser 12. The resultant heating of leg portion 30 causes the contact carrying end of that portion to deflect in a direction to separate contact 40 from contact 42. When the contacts 40 and 42 are separated, the energizing circuit for heater winding 44 is interrupted, and leg portion 30 commences to cool, deflecting in a direction to bring contact 40 into reengagement with contact 42 to reestablish the initial conditions. Leg portion 30 continues to deflect in alternate directions with a small amplitude motion, tending to maintain the effective wattage input (for any given resistance of senser 12) to the heater winding 44 constant. As a result, the heater winding 44 will receive energy as a series of pulsations, the average or effective value of which does not vary with variations in the magnitude of the voltage of source 10, and a pulsating voltage will appear between leg 30, and any parts electrically integral therewith, and conductor 28.

In the structural views, illustrating a preferred construction, the unit 10 is mounted within a generally cup-shaped insulating casing 52 having a base 54. The end of leg portion 32 of the polymetallic thermo-responsive element (best seen in FIGS. 3 and 5) is anchored upon a boss 56 formed integrally with the casing 52 by means of a rivet 58 which also serves, in the illustrated arrangement, as a terminal by means of which conductor 60 is made electrically integral with the polymetallic element. One end of heater 44 is connected to that element, and the other end is connected to rivet 50 which also secures the terminal T1 (FIG. 2) to the casing 52.

The contact 42, cooperating with active contacts 40 mounted on the free end of leg portion 30, is secured upon a screw 62 (FIG. 5) which is threaded into the casing 52 and the head of which is accessible from the rear of that casing to adjust the position of contact 42. Screw 62 is embraced by the bifurcated end of a connector 64 which is provided with a depending portion 66 carrying contact 24 which is matable with contact 25 in a manner to be described hereinafter.

For any given adjustment of screw 42, the device 10 functions to maintain the contacts 40 and 42 in a condition of incipient opening and closing with the temperature of the polymetallic leg portion 30 undulating about that temperature at which contacts 40 and 42 just close. With relatively fixed radiating conditions, this connotes that the heat output or wattage of the winding 44 will have a constant effective value over a period of time even though during that period the heater is energized and deenergized repetitively at the rate of opening and closing of the contacts 40—42. Since the resistance of wire 44 is fixed, the square of the effective current, and hence the effective current, will also be constant. The effective voltage appearing between polymetallic element 30 and conductor 28, and hence between output conductor 60 and conductor 28, equals the sum of a fixed voltage drop across heater 44 and a variable voltage drop across senser 12, the former being determined by the product of the fixed effective current and of the fixed resistance of heater 44, and the latter being determined by the product of the fixed current and the variable resistance of senser 12. Therefore, the effective output voltage from device 10 does not vary with changes in the voltage of source 20, but does vary directly with the resistance of senser 12. This output voltage appears between conductors 60 and 28.

The resistance of senser 12, the resistance of heater 44 and the position of contact 42 can be adjusted to meet varying system requirements. In a preferred arrangement, heater winding 44 had a resistance of 14 ohms, and the resistance of senser 12 varied from about 10 ohms at room temperature to about 20 ohms at 450° F. The unit was adjusted so that the relatively constant current through winding 44 and senser 12 was 150 milliamperes, and the unit pulsed at an average rate of about eighty times per minute.

It will be observed that the wattage dissipated by senser 12 at high sensed temperatures is greater than the wattage dissipated at low sensed temperatures in accordance with the change of resistance of the positive temperature coefficient of resistance senser and that this action tends to produce a self-amplifying effect, the increased self-heating at higher temperatures producing the effect of a higher resistance, thereby providing an amplified indication of the magnitude of the increase in sensed temperature. This effect can be magnified or minimized by selection of the magnitude of the current in the senser so as to adjust the relative magnitudes of the senser heating due to heat transfer with the body being sensed and the senser heating resulting from the passage of current therethrough.

While it was assumed in the foregoing discussion that the resistance of heater 44 is constant, it will be recognized that a wire having a positive temperature coefficient of resistance may be employed for that heater to vary the operation of the unit with temperature changes of the heater if desired.

The output voltage appearing between conductors 60 and 28 is applied across heater winding 100 of the responding device 14, one end of wire 60 and one end of heater 100 both being connected to a rivet 102 (FIGS. 3 and 4) and the other end of heater winding 100 being connected to leg portion 104 of a U-shape polymetallic element also including leg portion 106 disposed in spaced parallelism with leg portion 104 and crosspiece 108 which is provided with a flange 110. This polymetallic element is or may be identical to the polymetallic element of the pulsing device 10 with the preferred exception, as best illustrated in FIG. 3 of the drawings, that the two polymetallic elements are reversed from one another left to right (as mirror images) and positioned so that the active leg portion 104 of the element 14 is spaced from the wall of the casing 52 by an amount substantially equal to the spacing between the active leg portion 30 of the device 10 and the opposite wall of the casing 52. By virtue of this arrangement, both active leg portions are subjected to substantially identical heat transfer environments and to substantially identical radiation effects. It has been found that the ability of the system to operate consistently despite ambient temperature variations, and particularly despite abrupt and major changes in the ambient temperature, is substantially improved by virtue of the disclosed arrangement over an arrangement in which both polymetallic elements are of identical shape so that the distance between the active legs thereof and a wall of the casing differs materially. The disposition of the polymetallic elements in the noted positions is not, of course, imperative to the practicing of all of the principles of the invention.

Figure 2:
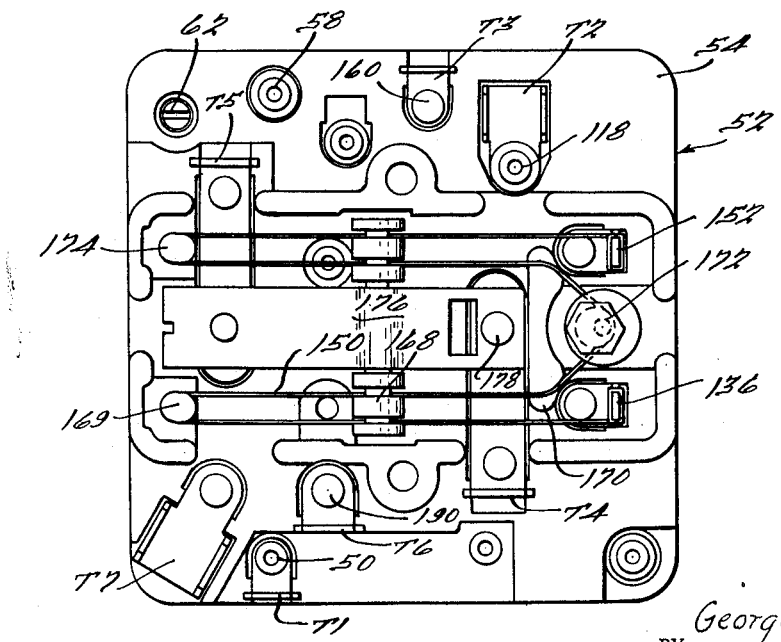
FIG. 2 is a rear elevational view of a structure including certain of the elements of the system of FIG. 1.

The tip of leg portion 106 is anchored as is represented by the earthing symbol 114 in FIG. 1. In the structural views, it will be seen that the end of leg portion 106 is secured to a boss 116 formed integrally with the casing 52 by means of a rivet 118 which also secures a terminal T2 in position at the back of the casing (FIG. 2). Conductor 28 is connected to leg portion 106 at terminal T2 and hence the entire polymetallic element is at the potential of conductor 28. Therefore, since one end of heater 100, on leg portion 104, is electrically connected to leg portion 104, it is also connected to conductor 28 through leg portion 104, cross-piece 108, and leg portion 106.

An armature 120 and an electrical contact 122 are secured to the free end of leg portion 104, electrical contact 122 being electrically integral with leg portion 104. Contact 122 is matable with an electrical contact 124 which is attached to the free end of an angled spring 126, the other end of which is fixed as by being attached to a boss 128 on the casing 52 by means of a rivet 130 (FIG. 3). A connector 132 is secured in electrical engagement with spring 126 by means of rivet 130 and extends into electrical engagement, through a rivet 134, with an anchor 136 (FIGS. 2 and 4) which serves as one input connection to the output relay device 16 as will be described.

It is desired, in the preferred arrangement, that the device 14 integrate the pulsations of energy which are applied to it from device 10 so that it will respond only to the effective value of the voltage between conductors 60 and 28, and that a spread or differential exists between the effective voltage at which the contacts 122 and 124 will be brought into engagement and the higher voltage at which contacts 122 and 124 will be separated. In the illustrated embodiment, this is accomplished by employing a permanent magnet to produce a snap action of the contacts, the permanent magnet in this case also serving as or carrying centered thereon the contact 124. This magnet cooperates with armature 120 so as to restrain separation of the contacts 122 and 124, those contacts being engaged, as a result of the pretension or bias in the polymetallic element of the device 14, when the leg portions 104 and 106 are at equal temperatures. In response to an increase in the effective voltage appearing across winding 100, leg portion 104 heats, tending to deflect in a direction to separate contact 122 from contact 124. This separation is inhibited by the magnetic action. However, when the effective voltage rises to a sufficient value, the contacts 122 and 124 abruptly separate. If thereafter the effective voltage applied across winding 100 is reduced, the temperature of leg portion 104 is lowered, and contact 122 approaches contact 124. When contact 122 is in a selected degree of proximity to contact 124, the magnetic attraction between permanent magnet 124 and armature 120 produces a rapid movement of the contact 122 into engagement with contact 124. By virtue of this construction, the system acts thermostatically, an adequate increase in the temperature sensed by senser 12 producing (with a positive temperature coefficient of resistance senser) an increase in the output voltage between conductors 60 and 28 of a sufficient magnitude to produce separation of contacts 122 and 124. These contacts will remain separated until the sensed temperature falls sufficiently to drop the effective voltage between conductors 60 and 28 to a value such that contact 122 will approach contact 124 sufficiently closely to produce snap closure. The contacts will remain closed until such time as the sensed temperature again rises to the selected higher value.

The sensed temperatures at which the contacts 122 and 124 are separated and closed are adjusted, in the illustrated arrangement, by adjusting the position of contact 124. To this end, a screw 138 is threaded through an aperture at the elbow of the spring 126 and engages the face of a cam 140 (best shown in the structural views) and hence serves as a cam follower to adjust the position of contact 124 in accordance with the rotational position of cam 140. A spring clip 142 clamps upon the spring 126 and frictionally engages the screw 138 to prevent loss of adjustment thereof due, for example, to vibration.

Cam 140, as well as a cam 144, is secured upon a shaft 146, one end of which is rotatably supported in an aperture 148 (FIG. 6) in the bottom 54 of the casing 52, and the other end of which may be guided in an aperture in a cover plate (not shown).

It will be perceived that the position of contact 124 determines the amount of flexure of the polymetallic portion 104 which is required to produce separation of contacts 122 and 124 and hence determines the required magnitude of the effective voltage across winding 100 and the required value of resistance of senser 12. Accordingly, the sensed temperature at which contact separation is produced is determined by the setting of shaft 146.

The closure of contacts 122 and 124 completes a circuit from one end of the secondary winding of transformer 22, conductor 28, through those contacts, spring 126, connector 132, anchor 136, sag wire 150 of the output relay 16 (which is representatively illustrated as a hot wire relay), anchor 152, connector 154 (which is electrically connected to member 64 as best shown in FIG. 3), contacts 24 and 25, terminal T3, and via conductor 26 to the other end of the secondary winding of transformer 22.

Contacts 24 and 25 are elements of a switch for controlling the energization of the control system. As previously noted, contact 24 is mounted upon member 64 (FIGS. 3 and 5). Contact 25 is supported upon a spring 156 which is secured to a bracket 158. Bracket 158 is mounted upon the casing 52 by means of a rivet 160 which also connects it to terminal T3 (FIG. 2). Spring 156 has an angularly bent portion 162 (FIG. 3) which in the illustrated "off" rotational position of shaft 146 falls within a recess 164 cut in cam 144 so that the contacts 24 and 25 become separated. As shaft 146 is rotated to place the equipment in operation and to adjust the controlled temperature, cam 144 engages portion 162 of spring 156 to force the contact 25 into engagement with contact 24 and maintain those contacts in engagement in all but the "off" position.

The hot wire relay 16 which is energized upon the closure of contacts 122 and 124 of device 14 is best illustrated in FIGS. 2 and 6 of the drawings. The wire 150 extends from anchor 136, through a slot in actuator 168, around a boss 169 formed integrally with the casing 52, back in a parallel course through another slot in actuator 168, into engagement with a guide 170, around an adjusting eccentric 172, into reengagement with guide 170, along a course paralleling the two initial courses and into engagement with a third slot in the actuator 168, around a boss 174 formed integrally with the casing 52, and back along a fourth parallel course and through a fourth slot in actuator 168 and is secured to anchor 152.

As may best be seen in FIG. 6 of the drawings, actuator 168 has a central portion engaging an offset portion of a spring 176 which is anchored to the bottom 54 of the casing 52 and electrically connected to terminal T4 (FIGS. 2 and 4) by means of a rivet 178. A contact 180 is carried at the other end of spring 176 and is matable with a contact 182 which is secured to the bottom 54 of the casing 52 and in electrical engagement with a terminal T5 (FIGS. 2 and 5) by means of a rivet 184.

As is best illustrated in FIG. 6, spring 176 is pretensioned or biased so as to tend to bring contact 180 into engagement with contact 182. However, when the wire 150 is at normal or room temperature, it exerts a force upon the spring 176 through the actuator 168 deflecting the spring so as to separate those electrical contacts, as shown in FIG. 1. When contacts 122 and 124 of device 14 close, the previously traced energizing circuit is completed whereby current flows through wire 150. Wire 150 heats and elongates and permits spring 176 to move contact 180 into engagement with contact 182. Terminal T4, electrically connected to contact 180, is connected to line 20c from the source 20 in the arrangement illustrated in FIG. 1. Terminal T5, associated with fixed contact 182, is connected to one terminal of the load 18. The other terminal of the load 18 is connected via terminal T6, contacts 184 and 186, and terminal T7 to line 20a from the source 20.

In use in association with a stove, the disclosed apparatus may be subjected to substantial variations in ambient temperature, and these variations may adversely affect the consistency of operation of the hot wire relay. This invention is directed to the ambient temperature compensation of the relay and its associated elements.

The wire 150 is selected to have a substantial thermal coefficient of linear expansion. For example, a Nichrome wire having a coefficient of 0.000017 inch per inch per degree of centigrade was utilized in a constructed embodiment of the invention. As a result, wire 150 will tend to vary in length with changes in the ambient temperature independently of those changes of length which occur as a result of energization of the relay. The relation between ambient temperature and wire length is direct since the coefficient is positive. Hence, at higher ambient temperatures, the wire tends, from this effect, to elongate.

When the wire 150 is energized, the self-heating raises the temperature of the wire substantially above ambient. For example, in the noted constructed embodiment, some seven watts of energy were dissipated in the wire and its temperature was raised to approximately 800 degrees of Fahrenheit. Since the heat radiation from one body to another varies in accordance with the difference between the fourth powers of their absolute temperatures, an equal increase of both the ambient temperature and the energized hot-wire temperature will produce an increase in the radiation from the wire to the ambient with any given electrical power input to the wire. As a result of this increased radiation, a given increase in the ambient temperature will not, when the relay is energized, produce a corresponding increase in the temperature of the wire. Considering only the two discussed factors, the net effect, when the relay is energized, of an increase in ambient temperature is to produce elongation of the wire, although the total elongation is not as great as it would be were there no fourth-power radiation effect.

Ambient temperature changes also tend to produce an effect on the wire length due to the resultant change in resistance of the wire. In the constructed arrangement, however, the temperature coefficient of resistance of the wire is so small that this effect was not significant.

As may best be seen in FIG. 2 of the drawings, each leg of the wire 150 extends between a pair of spaced-apart elements, e.g., the lowermost reach in FIG. 2 extends between anchor 136 and element 169. The distance between the several anchoring or bight-locating elements is established by the insulating casing 52, since each of those elements is secured to or integral with the casing. The casing itself may have a substantial temperature coefficient of linear expansion, and in the noted constructed embodiment the casing was constructed of a phenol formaldehyde and had a coefficient of about 0.000022 inch per inch per degree centigrade.

The net result of these several effects, when the relay is energized, is to establish, in effect, an inverse relationship between wire length and ambient temperature. An increase in ambient temperature will produce, in effect, a shortening of the wire and a change in the operation of the apparatus.

To compensate for this tendency, the anchors 136 and 152 are bimetallic elements. Each anchor is generally L-shaped with one of its legs being riveted or otherwise secured to the casing 54 and with the other one of its legs, the upright leg, extending perpendicularly to the base of the casing and perpendicularly to the corresponding reach of wire. The upright leg, in the constructed arrangement, had a free length (between the base and the point of attachment of the wire) of about ¼ inch, a width of about ⅜ inch, and a thickness of about 0.020 inch. The anchors, in the constructed embodiment, were formed of Chase 6650 bimetal, having a manganese-copper alloy element joined with an Invar element. The flat face of the upright portion is disposed perpendicularly to the wire and the high expansion metal is disposed on the side remote from the wire so that an increase in the temperature of the bimetal produced deflection in a direction towards the wire—tending to reduce the tension in the wire. The magnitude of the deflection, with changes in ambient temperature, compensates for the resultant of the previously discussed effects so that, when the relay is energized, there is substantially no change in contact force or in the manner of operation of the relay with changes in the ambient temperature over the noted range.

Contacts 184 and 186 are closed whenever the shaft 146 (FIGS. 3–6) is turned from its "off" position. As may best be seen in FIG. 3 of the drawings, contact 184 is supported upon a bracket 188 which is secured to the bottom 54 of the casing 52 and in electrical engagement with terminal T6 (FIG. 2) by means of a rivet 190. Contact 180 is carried upon a spring 192 which is anchored to a bracket 194, and bracket 194 is in turn secured to the bottom 54 of the casing 52 and electrically connected to terminal T7 by means of rivet 196. The free end of spring 192 is bent to define a cam follower 198 adapted to cooperate with a notched protuberance 200 upon the cam 144. When shaft 146 is in its "off" position, protuberance 200 moves spring 192 to separate contacts 186 and 184. In all other positions of rotation of shaft 146, contact 186 is in engagement with contact 184 so as to connect the load and the transformer primary winding to the source, as shown in FIG. 1.

The hot wire relay 16 follows the operation of device 14, closure of contacts 122 and 124 of device 14 producing closure of contacts 180 and 182 and opening of contacts 122—124 terminating heating of hot wire 150 and causing contact 180 to be separated from contact 182. As a result, heater 18 (or any other appropriate load device) is intermittently energized in accordance with the sensed temperature of the body.

In the above noted constructed embodiment of the invention, the resistance of responder winding 100 was selected to be 42 ohms which was found to produce a suitable change in the power supplied to winding 100 with a given change of temperature of the body as sensed by sensor 12. It will be recognized that considerable freedom is available in the selection of the resistance of winding 100 since, as distinguished from the arrangement disclosed in the above identified Whinery application, the heat dissipating capabilities of the sensor 12 are not controlling in the selection of the resistance of winding 100. The ratio of wattage change in the winding 100 with a given change in the sensor resistance is, at least over a range, effectively independent of the value of winding 100, but the present arrangement permits higher absolute values of wattage to be applied to the winding 100 so that the absolute wattage change produced by a given sensed temperature change can be much larger than was the case in the system disclosed in the Whinery application.

It is contemplated that the system of FIG. 1 can be modified in accordance with the teachings of the above identified Whinery application so that the pulse rate of the voltage regulator is slowed, as by means of an additional permanent magnet and the response time of the responding device is reduced, as by deletion of the permanent magnet, so that the responding device will follow, pulse by pulse, the pulsing device, although the illustrated arrangement is preferred.

While the polymetallic elements of devices 10 and 14 have been illustrated to be U-shaped and ambient compensated, the provision of ambient temperature compensation or the achievement of ambient temperature compensation in this particular fashion is not essential to the practice of all of the principles of the present invention. It will also be appreciated that the sensor can have a negative temperature coefficient of resistance, that the winding 100 can be disposed on the back leg portion 106, that contacts 122—124 can be normally open and be closed in response to heating of a leg portion of device 14, that contacts 180 and 182 can be normally closed and be opened in response to heating of wire 150, and that other such reversals can be made by correspondingly reversing others of these factors to obtain the proper operation.

Desirably but not necessarily, ambient temperature compensation for those portions of the system short of the output relay is achieved by causing the output of device 10 to vary with changes of ambient temperature in a direction and magnitude to compensate for the changing current requirements of device 14 with that same change of ambient temperature, as taught in Boddy Patent No. 2,835,885.

While it will be apparent that the embodiment of the invention herein disclosed is well calculated to fulfill the objects of the invention, it will be appreciated that the invention is suceptible to modification, variation and change without departing from the proper scope or fair meaning of the subjoined claims.

What is claimed is:

1. An ambient temperature compensated hot wire relay mechanism responsive to current flow in an input electrical circuit for controlling the current in an output electrical circuit comprising a base, first and second mateable electrical contacts connectable in the output circuit, means supporting said second electrical contact upon said base, resilient means supporting said first electrical contact and tending to force said first electrical contact into a preselected relationship with said second electrical contact, a pair of support elements supported in spaced relation upon said base for supporting a metal wire, said wire connected to and supported by and tensioned between said support elements and connected in the input circuit and adapted to elongate to a substantial degree in response to heating thereof resulting from current therethrough, and means including said wire engaging said resilient means for exerting a force upon and controlling said resilient means, one of said support elements having a bimetallic leg portion deflectable in response to changes in temperature to tend to vary the tension in said wire.

2. An ambient temperature compensated hot wire relay mechanism responsive to current flow in an input electrical circuit for controlling the current in an output electrical circuit comprising a base, first and second mateable electrical contacts connectable in the output circuit, means supporting said second electrical contact upon said base, resilient means supporting said first electrical contact and tending to force said first electrical contact into a preselected relationship with said second electrical contact, a pair of support elements supported in spaced relation upon said base for supporting a metal wire, said wire connected to and supported by and tensioned between said support elements and connected in the input circuit and adapted to elongate to a substantial degree in response to heating thereof resulting from current therethrough, and means including said wire engaging said resilient means for exerting a force upon and controlling said resilient means, one of said support elements having a bimetallic leg portion extending perpendicularly to said wire and deflectable in response to changes in temperature to tend to vary the tension in said wire.

3. An ambient temperature compensated hot wire relay mechanism responsive to current flow in an input electrical circuit for controlling the current in an output electrical circuit comprising a base, first and second mateable electrical contacts connectable in the output circuit, means supporting said second electrical contact upon said base, resilient means supporting said first electrical contact and tending to force said first electrical contact into a preselected relationship with said second electrical contact, a pair of support elements supported in spaced relation upon said base for supporting a metal wire, said wire connected to and supported by and tensioned between said support elements and connected in the input circuit and adapted to elongate to a substantial degree, in response to heating thereof resulting from current therethrough, and means including said wire engaging said resilient means for exerting a force upon and controlling said resilient means, one of said support elements having a bimetallic leg portion extending perpendicularly to said wire and deflectable in response to an increase in temperature in a direction tending to reduce the tension in said wire.

4. An ambient temperature compensated hot wire relay mechanism responsive to current flow in an input electrical circuit for controlling the current in an output electrical circuit comprising a base, first and second mateable electrical contacts connectable in the output circuit, means supporting said second electrical contact upon said base, resilient means supporting said first electrical contact and tending to force said first electrical contact into a preselected relationship with said second electrical contact, a pair of support elements supported in spaced relation upon said base for supporting a metal wire, said wire having a substantial positive temperature coefficient of linear expansion connected to and supported by and tensioned between said support elements and connected in the input circuit and adapted to elongate to a substantial degree, in response to heating thereof resulting from current therethrough, and means including said wire engaging said resilient means for exerting a force upon and controlling said resilient means, one of said support elements having a bimetallic leg portion extending perpendicularly to said wire and deflectable in response to changes in temperature to tend to vary the tension in said wire.

5. An ambient temperature compensated hot wire relay mechanism responsive to current flow in an input electrical circuit for controlling the current in an output electrical circuit comprising a base having a substantial positive temperature coefficient of linear expansion and tending to increase the tension in said wire in response to an increase in ambient temperature, first and second mateable electrical contacts connectable in the output circuit, means supporting said second electrical contact upon said base, resilient means supporting said first electrical contact and tending to force said first electrical contact into a preselected relationship with said second electrical contact, a pair of support elements supported in spaced relation upon said base for supporting a metal wire, said wire having a substantial positive temperature coefficient of linear expansion and tending to elongate in response to an increase in ambient temperature connected to and supported by and tensioned between said support elements and connected in the input circuit and adapted to elongate to a substantial degree, in response to heating thereof resulting from current therethrough, and means including said wire engaging said resilient means for exerting a force upon and controlling said resilient means, one of said support elements having a bimetallic leg portion extending perpendicularly to said wire and deflectable in response to changes in temperature to tend to vary the tension in said wire in a direction to reduce the net effect on said wire of changes in ambient temperature.

6. The combination of claim 5 in which the effect of said bimetallic leg portion and the effect of said positive temperature coefficient of linear expansion of said wire in response to changes of ambient temperature are in opposition to the effect of said temperature coefficient of linear expansion of said base.

7. A hot wire relay mechanism responsive to current flow in an input electrical circuit for controlling the current in an output electrical circuit comprising a base, first and second mateable electrical contacts connectable in the output circuit, means securing said second contact on said base, a cantilever spring controlling the position of said first contact and so supported upon said base as to exert a force tending to move said first contact in one direction into a preselected positional relationship with said second contact, a first bearing element supported upon said spring, a metal wire engaging said first bearing element at a plurality of spaced-apart portions of its length and connectable in the input circuit and adapted to elongate to a substantial degree, in response to heating thereof resulting from current therethrough, an additional bearing element mounted on said base and spaced from said first bearing element, said wire having a portion engaging said additional bearing element, and a pair of spaced-apart anchor means for anchoring the ends of said wire and positioned to cause said wire to exert plural equal forces in the same direction on said first bearing element, one end of said wire being fixed to one of said anchor means, the other end of said wire being fixed to the other one of said anchor means, one of said anchor means being bimetallic and deflecting in response to changes in ambient temperature to tend to vary the tension of said wire for ambient temperature compensating said relay.

8. A hot wire relay mechanism responsive to current flow in an input electrical circuit for controlling the current in an output electrical circuit comprising a base, first and second mateable electrical contacts connectable in the output circuit, means securing said second contact on said base, a cantilever spring controlling the position of said first contact and so supported upon said base as to exert a force tending to move said first contact in one direction into a preselected positional relationship with said second contact, a first bearing element supported upon said spring, a metal wire engaging said first bearing element at a plurality of spaced-apart portions of its length and connectable in the input circuit and adapted to elongate to a substantial degree, in response to heating thereof resulting from current therethrough, an additional bearing element mounted on said base and spaced from said first bearing element, said wire having a portion engaging said additional bearing element, and a pair of spaced-apart anchor means for anchoring the ends of said wire and positioned to cause said wire to exert plural equal forces in the same direction on said first bearing element, one end of said wire being fixed to one of said anchor means, the other end of said wire being fixed to the other one of said anchor means, both of said anchor means being bimetallic and deflecting in response to changes in ambient temperature to tend to vary the tension of said wire for ambient temperature compensating said relay.

9. An ambient temperature compensated hot wire relay mechanism responsive to current flow in an input electrical circuit for controlling the current in an output electrical circuit comprising a base, first and second mateable electrical contacts connectable in the output circuit, means supporting said second electrical contact upon said base, resilient means supporting said first electrical contact and tending to force said first electrical contact into a preselected relationship with said second electrical contact, a metal wire connectable in the input circuit and having a substantial temperature coefficient of expansion and adapted to elongate to a substantial degree, in response to heating thereof resulting from current therethrough, means for supporting said wire on said base under tension, means including said wire engaging said resilient means for exerting a force upon and controlling said resilient means in accordance with the tension of said wire, a polymetallic member supported on said base, and means including said polymetallic member and engaging a portion of said wire and movable in response to a change of the ambient temperature of said relay mechanism for moving said portion of said wire in a direction and by an amount to compensate for the changes of the force applied to said resilient means by said wire which would otherwise occur in response to the change of the temperature of said wire resulting from said change of ambient temperature.

10. An ambient temperature compensated hot wire relay mechanism responsive to current flow in an input electrical circuit for controlling the current in an output electrical circuit comprising a base having a significant temperature coefficient of expansion, first and second mateable electrical contacts connectable in the output circuit, means supporting said second electrical contact upon said base, resilient means of supporting said first electrical contact and tending to force said first electrical contact into a preselected relationship with said second electrical contact, a metal wire connectable in the input circuit and having a substantial temperature coefficient of expansion and adapted to elongate to a substantial degree, in response to heating thereof resulting from current therethrough, means for supporting said wire on said base under tension, means including said wire engaging said resilient means for exerting a force upon and controlling said resilient means in accordance with the tension of said wire, a polymetallic member supported on said base, and means including said polymetallic member engaging a portion of said wire and movable in response to a change in the ambient temperature of said relay mechanism for moving said portion of said wire in a direction and by an amount to compensate for the changes of the force applied to said resilient means by said wire which would otherwise occur in response to the change of temperature of said wire and of said base resulting from said change of ambient temperature.

References Cited in the file of this patent

UNITED STATES PATENTS

| | | |
|---|---|---|
| 921,625 | Phelps | May 11, 1909 |
| 1,773,708 | Whittingham | Aug. 19, 1930 |
| 1,946,894 | Brogger | Feb. 13, 1934 |
| 1,958,696 | Bigby | May 15, 1934 |
| 2,126,199 | Lilja | Aug. 9, 1938 |
| 2,384,869 | Zuckermann | Sept. 18, 1945 |
| 2,816,999 | Fry | Dec. 17, 1957 |
| 2,846,543 | Sivacek | Aug. 5, 1958 |
| 2,863,023 | Rowe | Dec. 2, 1958 |
| 2,877,333 | Long et al. | Mar. 10, 1959 |

FOREIGN PATENTS

| | | |
|---|---|---|
| 290,134 | Great Britain | May 10, 1928 |